(12) United States Patent
Blum

(10) Patent No.: US 8,078,242 B2
(45) Date of Patent: Dec. 13, 2011

(54) INTERNAL IMPEDANCE CONVERTING SUPERCONDUCTING ACYCLIC POWER CONVERTER

(75) Inventor: Dieter Wolfgang Blum, Aldergrove (CA)

(73) Assignee: Dynamo Capital, Inc., Abilene, TX (US)

( * ) Notice: Subject to any disclaimer, the term of this patent is extended or adjusted under 35 U.S.C. 154(b) by 150 days.

(21) Appl. No.: 12/424,508

(22) Filed: Apr. 15, 2009

(65) Prior Publication Data

US 2010/0264771 A1 Oct. 21, 2010

(51) Int. Cl.
- F16C 39/06 (2006.01)
- H02K 9/00 (2006.01)
- H02K 9/08 (2006.01)
- H01B 12/00 (2006.01)
- H01F 6/00 (2006.01)

(52) U.S. Cl. .......... 505/166; 310/52; 505/876; 505/877; 505/878; 505/211; 505/210; 505/231

(58) Field of Classification Search .................. 310/178; 505/166, 210, 211, 876, 877, 878, 231; *H02K 9/00, H02K 9/08; F16C 39/06; H01F 6/00; H01B 12/00*
See application file for complete search history.

(56) References Cited

U.S. PATENT DOCUMENTS

| | | |
|---|---|---|
| 293,758 A | 2/1884 | Lubke |
| 339,772 A | 4/1886 | Hering |
| 342,587 A | 5/1886 | Eickemeyer |
| 342,588 A | 5/1886 | Eickemeyer |
| 342,589 A | 5/1886 | Eickemeyer |
| 351,902 A | 11/1886 | Eickemeyer |
| 351,903 A | 11/1886 | Eickemeyer |
| 351,904 A | 11/1886 | Eickemeyer |
| 351,907 A | 11/1886 | Eickemeyer |
| 352,234 A | 11/1886 | Eickemeyer |
| 396,149 A | 1/1889 | Eickemeyer |
| 400,838 A | 4/1889 | Entz |
| 406,968 A | 7/1889 | Tesla |
| 515,882 A | 3/1894 | Maynadier |
| 523,998 A | 8/1894 | Rennerfelt |
| 561,803 A | 6/1896 | Mayer |
| 645,943 A | 3/1900 | Dalen et al. |
| 678,157 A | 7/1901 | Bjarnason |
| 742,600 A | 10/1903 | Cox |
| 789,444 A | 5/1905 | Noeggerath |
| 805,315 A | 11/1905 | Noeggerath |
| 826,668 A | 7/1906 | Ketchum |
| 832,742 A | 10/1906 | Noeggerath |
| 854,756 A | 5/1907 | Noeggerath |
| 859,350 A | 7/1907 | Thomson |

(Continued)

OTHER PUBLICATIONS

PCT International Search Report and Written Opinion for International Application No. PCT/IB2006/003570; Date of mailing May 24, 2007. 30 pages.

*Primary Examiner* — Quyen Leung
*Assistant Examiner* — Terrance Kenerly
(74) *Attorney, Agent, or Firm* — Patent Technologies, LLC; Robert D. Gunderman, Jr.

(57) ABSTRACT

An electromechanical power converter that has a rotor assembly with a conductive shell, a first conductor made from superconducting material that is in series electrical contact with the conductive shell and a second conductor made from superconducting material and in series electrical contact with said conductive shell, thus providing an internal impedance converting electromechanical power converter.

13 Claims, 9 Drawing Sheets

U.S. PATENT DOCUMENTS

| | | |
|---|---|---|
| 3,229,133 A | 1/1966 | Sears |
| 3,465,187 A | 9/1969 | Breaux |
| 3,646,394 A | 2/1972 | Swartz et al. |
| 3,875,484 A | 4/1975 | Williams et al. |
| 4,097,758 A | 6/1978 | Jenkins |
| 4,208,598 A * | 6/1980 | Popov et al. .................... 310/64 |
| 4,514,653 A | 4/1985 | Batni |
| 5,216,568 A * | 6/1993 | Harada et al. ................... 361/19 |
| 5,241,232 A | 8/1993 | Reed |
| 5,278,470 A | 1/1994 | Neag |
| 5,451,825 A | 9/1995 | Strohm |
| 5,587,618 A | 12/1996 | Hathaway |
| 5,764,121 A * | 6/1998 | Wheatley et al. ............... 335/216 |
| 5,892,644 A * | 4/1999 | Evans et al. ...................... 361/19 |
| 5,949,174 A * | 9/1999 | Moss et al. ..................... 310/233 |
| 5,977,684 A | 11/1999 | Lin |
| 6,169,352 B1 * | 1/2001 | Hull ....................... 310/216.062 |
| 6,307,370 B1 * | 10/2001 | Schauwecker et al. ....... 324/318 |
| 7,463,914 B2 | 12/2008 | Blum |
| 2001/0045790 A1 | 11/2001 | Whitesell |
| 2002/0053889 A1 | 5/2002 | Gold |
| 2006/0279164 A1 * | 12/2006 | Blum ........................... 310/261 |
| 2007/0164615 A1 * | 7/2007 | Lewis et al. ..................... 310/12 |
| 2007/0222315 A1 * | 9/2007 | Walter ........................ 310/90.5 |

* cited by examiner

INTERNAL IMPEDANCE CONVERTING SUPERCONDUCTING ACYCLIC POWER CONVERTER

BACKGROUND OF THE INVENTION

1. Field of the Invention

This invention relates generally to electromechanical power converters, and more particularly to an internal impedance converting superconducting acyclic power converters.

2. Description of the Related Art

For a general understanding of the present invention, the following brief background of electromechanical power converters, acyclic machinery, and a historical perspective of electromagnetic machinery is presented.

The creation of magnetomotive force (MMF) in electrical conductor assemblies in the presence of a magnetic field by the flow of current in the electrical conductor assemblies causes translation of the electrical conductor assemblies with respect to the magnetic field. An apparatus used to produce a motive force using electrical current flow is commonly known as an electric motor.

The creation of an electromotive force through the translation of electrical conductor assemblies within a magnetic field is normally termed the generation of electricity from motive force. An apparatus used to generate electricity through the translation of electrical conductor assemblies within a magnetic field is commonly known as an electric generator.

The methods of utilizing electrodynamic interactions, as embodied by a motor in the case of magnetomotive force, or as embodied by a generator in the case of electromotive force, and their resultant apparatus embodiments may be divided into two classes, depending upon the temporal characteristics of the particular electrodynamic interactions utilized.

The first class of electrodynamic interactions, upon which the preponderance of present day electromagnetic machinery is based, can be termed cyclic. This terminology relates to the time varying (cyclical) nature of the electrodynamic interactions employed (at the macroscopic level). That is, there are cyclical electrodynamic interactions that effect either the production of Magnetomotive force or Electromotive Force within the apparatus (machine). Further, it is not at all relevant whether the cyclic apparatus utilizes or produces direct current or alternating current, as all cyclic machines are inherently dependent on time-variant electrodynamic interactions, and as such all cyclic machines are all based on alternating current or a form of time varying current. Today's direct current machines simply rely on commutation/switching means in order to appear as a direct current apparatus to the external world. Commutation or switching may be performed mechanically or electronically. Modern day direct current machine interactions are only quasi time-invariant during the time that a conductor element is translating (sweeping) through the mostly uniform magnetic field present under a salient pole of such a machine.

The second class of electrodynamic interactions are those that can be termed acvelic. This terminology relates to the time invariant (acyclical) nature of the electrodynamic interactions employed (at the macroscopic level). That is, there are acyclical (or continuous) electrodynamic interactions that effect either the production of magnetomotive force or electromotive force within the apparatus (machine.) Inherently, in all acyclic topologies, all macroscopic electrodynamic interactions are deemed to be time-invariant, that is, neither their polarity nor their intensity changes over time.

Acyclic machines have frequently been called homopolar, relating to having magnetic poles on the same center, or are sometimes referred to as Faraday machines, and have also been erroneously called unipolar (having one magnetic pole, which is incorrect, as all electromagnetic apparatus require and do indeed have, at least two opposing magnetic poles.)

Acyclic machines are the only true type of direct current apparatus in existence. Acyclic machines dispense with the many inefficiencies of cyclic alternating current machines, and further eliminate the need for expensive, cumbersome and maintenance prone commutation and switching devices used in today's "direct current" machines.

The present invention relates to the field of acyclic electromagnetic motors and generators that operate without the need for commutation or switching of electrical currents, and to acyclic electromagnetic motors and generators that utilize superconducting material to cause internal impedance change.

Of necessary and relevant background to understanding and describing the present invention is a brief overview of the development of electrodynamics as it relates to electromagnetic machinery in general, and to acyclic machinery in particular, along with a discussion on how acyclic machinery has essentially been ignored in favor of more complex cyclical machinery.

In 1821, Faraday secured the rotary motion of a conductor carrying a DC electric current within a uniform, homogenous and radially symmetric magnetic field. He had discovered the continuous rotary electrodynamic production of magnetomotive force with an apparatus having a homopolar and acyclic topology. Faraday subsequently produced this "electromagnetic rotator" for shipment to other scientists, in order that they may reproduce his experimental results. Faraday went on to cause a magnet to revolve about the axis of a current-carrying conductor in 1821. These were certainly the world's first electric motors, being electromechanical converters for producing mechanical work from the flow of electricity.

Faraday's original homopolar/acyclic "electromagnetic rotator" effect was not investigated or pursued as a potential electric motor, primarily because of the large amount of DC current it required in order to operate due to its very low impedance. This lack of interest persisted in spite of the fact that the Faraday electromagnetic rotator required no complicated switching mechanism such as the solenoids used in the reciprocating "electric motors" of the time. Similar complicated switching mechanisms still exist in many of the direct current machines of today.

The continuous rotary electrodynamic production of electromotive force was first observed in 1831, also by Faraday. Again, Faraday secured the rotation of a conductor (in this case, a conductive disk) within a magnetic field and discovered that an electromotive force was "induced" between the center axis of the rotating disk and its periphery. When an external circuit was completed between the two points, an electric current was seen to flow. In this instance, Faraday had discovered the production of electromotive force with an apparatus having a homopolar and acyclic topology. This was the world's first direct-current electric generator, an electromechanical converter for producing electric current flow from the input of mechanical work.

Faraday's original homopolar generator was also not pursued as a potential electric generator, once again because it produced large amounts of DC current at low voltages due to its characteristic low impedance.

From their inception and discovery, acyclic topologies for producing magnetomotive force or electromotive force have only been lightly investigated in comparison to conventional cyclic rotary electromechanical power converters. Due to their seemingly inherent low impedance, both acyclic generators and motors have to this day been relegated, for the most part, to laboratory use and specialty applications requiring low voltages and high currents.

Between 1900 and the present, there have been some notable developments in the field of acyclic generators and acyclic motors. In 1904, Noeggerath performed experiments attempting to produce higher DC voltages using a homopolar topology, wherein he series-connected multiple electromotive force inducing elements via slip-rings. This resulted in the successful construction of a 500 volt, 300 Kilowatt apparatus the same year. In 1912, Lamme at Westinghouse, designed, constructed and supplied a 260 volt, 2 Megawatt apparatus. This machine was used for a few years before it was mothballed because of the lower cost of AC power. In Germany, many firms were also building what was termed at the time unipolar generators. A 10 volt, 5000 amp @3000 RPM machine was constructed in 1913, and was still in service in 1940, being used to test high-current switches and interrupters (referenced in the German text "Unipolarmaschine fur kleine spannungen und hohe strome" published in "Elektrotechnische Zeitschrift, 61. Jahrg. Heft 16, 18. April 1940.)

By about 1920, current collector brush and slip-ring difficulties such as brush and slip-ring voltage drops and $I^2R$ losses had halted acyclic development, and the acyclic machine had been overtaken by commutated direct current machinery and later even more so by alternating current generators (alternators) due to their operating safety, reliability and economy. "As an electric generator for lighting and power-grid supply, the acyclic machine had lost its place forever!" (Translated from the German text "Unipolarmaschine fur kleine spannungen und hohe strome" published in "Elektrotechnische Zeitschrift, 61. Jahrg. Heft 16, 18. April 1940.)

For almost twenty years, acyclic methods and machinery lay dormant again. In reference texts, acyclic and homopolar machinery was given short and shrift treatment, generally with the remark that they failed due to the abovementioned brush/slip-ring and $I^2R$ problems. Due to the needs of the chemical industry just before WWII, there was a brief renewed interest in acyclic direct current generation, especially in Germany, where in 1935, a 7.5 volt, 150,000 amp@514 RPM machine was constructed. This machine was similar to machines constructed prior to WWI, in that it employed insulated conductors embedded into armature slots with brushes and slip-rings to provide the series electromotive force summation of multiple electromotive force inducing armature elements (referenced in the German text "Unipolarmaschine fur kleine spannungen und hohe strome" published in "Elektrotechnische Zeitschrift, 61. Jahrg. Heft 16, 18. April 1940.)

Much simpler in construction was an apparatus first proposed by Poirson, who in 1930 built a 7 volt, 15,000 amp@1800 RPM machine and then a second, substantially larger machine rated at 14 volt, 50,000 amp@750 RPM. This machine was demonstrated at the Paris World Exhibition in 1937. Both of these designs utilized a non-slotted rotor, which served as the armature core, slip-ring and electromotive force producing conductor (referenced in the German text "Unipolarmaschine fur kleine spannungen und hohe strome" published in "Elektrotechnische Zeitschrift, 61. Jahrg. Heft 16, 18. April 1940.)

After another dormancy period of 1940 to 1960, acyclic topologies again became a topic of interest, when General Electric and the US Navy investigated acyclic motors and generators for their potential applications in marine propulsion. An example of such a machine was an acyclic generator rated at 67V, 150000 A@3600 RPM, produced by General Electric in 1964, as mentioned in the text "Electromechanical Power Conversion" by Levi and Panzer, 1974.

Also, from the mid-1960's to the present, superconducting and high-temperature superconducting (HTS) field coil designs and liquid-metal (eutectic) current collector brushes, have been introduced, developed and utilized in specific high-power applications such as fusion research, rail-gun launchers, welding, and the like. For example, the Center for Electromechanics (CEM) at the University of Texas at Austin has produced both disk and drum-type acyclic generators with outputs ranging from 5 to 10 Megawatts. They have also designed pulsed homopolar welding generators for pipe welding, which were produced by OIME Inc.

More recently, in 1997, the US Navy announced its HTSC (high-temperature super-conducting) acyclic/homopolar marine propulsion motor test results. Also in 1997, CEM and Parker Kinetic Designs announced their work on an acyclic traction motor for automobiles and locomotives. And even more recently (2002-2005), the US Navy announced further investigation of acyclic marine propulsion motors employing High Temperature Superconducting field coils using General Atomics' 5 Megawatt and 36 Megawatt machines.

Recently, acyclic machines employing rolling contacts that eliminate sliding current collectors have been introduced, and homopolar (but bipolar, and not acyclic) apparatus employing multiple microfibre composite metal brushes and multiple current carrying segment commutation have been proposed.

Systems for the electromechanical conversion of power are well known, for the most part concerning cyclical heteropolar topologies, that effect the series summation of magnetomotive force producing current flow through active conductor segments, or effect the series summation of the electromotive force produced in active conductor segments. In both of these heteropolar cases the chosen form for the active conductor assemblies is typically a coiled (or coil-formed) series conductor winding.

There are essentially three groups of related art involving acyclic machines. In Group 1 are the vast majority that do not use or employ series summation of active conductor segments or elements, but are simple single active conductor element apparatus such as disk, drum, cylindrical, bell-shaped, parallel connected drum, sheet stacks, and the like.

Group 2 includes those acyclic topologies which utilize a plurality of active conductor segments or elements and attempt to effect the series summation of produced magnetomotive force or induced electromotive force by utilizing multiple slip-ring/brush assemblies for such electrical series summation, or by utilizing counter-rotating active elements and attendant slip-ring/brush assemblies.

To the inventor's best present knowledge and belief, the following is a summary listing of such Group 2 related art: U.S. Pat. No. 293,758 (Lubke, 1884); U.S. Pat. No. 339,772 (Hering, 1886); U.S. Pat. Nos. 342,587, 342,588, 342,589, 351,902, 351,903, 351,904, 351,907 and U.S. Pat. No. 352, 234 (all to Eickemeyer, 1886); U.S. Pat. No. 406,968 (Tesla, 1889); U.S. Pat. No. 396,149 (Eickemeyer, 1889); U.S. Pat. No. 400,838 (Entz, 1889); U.S. Pat. No. 515,882 (Maynadier, 1894); U.S. Pat. No. 523,998 (Rennerfelt, 1894); U.S. Pat. No. 561,803 (Mayer, 1896); U.S. Pat. No. 645,943 (Dalen et al., 1900); U.S. Pat. No. 678,157 (Bjamason, 1901); U.S. Pat. No. 742,600 (Cox, 1903); U.S. Pat. No. 789,444 and U.S. Pat. No. 805,315 (both to Noeggerath, 1905); U.S. Pat. No. 826, 668 (Ketchum, 1906); U.S. Pat. No. 832,742 (Noeggerath, 1906); U.S. Pat. No. 854,756 (Noeggerath, 1907); U.S. Pat. No. 859,350 (Thomson, 1907); U.S. Pat. No. 3,229,133

(Sears, 1966); U.S. Pat. No. 3,465,187 (Breaux, 1969); U.S. Pat. No. 4,097,758 (Jenkins, 1978); U.S. Pat. No. 4,514,653 (Batni, 1985); U.S. Pat. No. 5,241,232 (Reed, 1993); and U.S. Pat. No. 5,587,618 (Hathaway, 1996.)

An example of recent related art attempting to provide for series summation of induced electromotive force potentials in acyclic generators (or of magnetomotive force in motors) is U.S. Pat. No. 5,241,232 to Reed, which utilizes a conductive belt between two or more active elements in order to provide for such series summation. The apparatus of the Reed patent is similar to that of Tesla from more than 100 years prior, in that they both utilize a flexible conductive belt to electrically connect two co-rotating active elements in series.

Another recent example is U.S. Pat. No. 5,587,616 to Hathaway, which utilizes a complex plurality of synchronously counter-rotating armatures and associated slip-rings and sliding contacts in order to provide for series summation.

The group 2 related art as described above attempts to create series summation using various complex and cumbersome techniques requiring multiple elements. The present invention improves upon the group 2 related art by using a single active element within the same total overall intensity magnetic flux field.

Group 3 related art contains those acyclic topologies which utilize a multiplicity of active conductor segments or elements and attempts to effect the series summation of produced magnetomotive force or induced electromotive force by utilizing some form of "series winding" or "series arrangement" of said multiple active conductor segments or elements, thereby attempting to provide such series summation directly.

To the inventor's best present knowledge, the following is a summary listing of such Group 3 related art:
U.S. Pat. No. 5,278,470 (Neag, 1994); U.S. Pat. No. 5,451,825 (Strohm, 1995); and U.S. Pat. No. 5,977,684 (Lin, 1999.)

The Group 3 related art topologies and apparatus fail, however, to achieve the series summation of induced electromotive force (generator action) or produced magnetomotive force (motor action.) In U.S. Pat. No. 5,278,470 (Neag) and U.S. Pat. No. 5,451,825 (Strohm), the inventions fail to take into account the reverse electromotive forces that will be induced (or reverse magnetomotive force torques that will be produced) due to return flux paths/interlinkages interacting with active conductor segments/elements (whether such interaction was intended or not.)

In the particular case of the Neag patent, FIG. 1A of the Neag patent clearly shows flux paths/interlinkages being completed. In the process however, producing perfectly canceling electromotive forces or magnetomotive forces as the case might be, in the peripheral conductor segments forming part of his series winding on the rotor. The fact that the peripheral conductor segments are sunk into slots in the magnetically permeable rotor will not lead to any appreciable shielding of said conductor segments, and hence will fail to have the rotor series winding produce any measurable electromotive force or magnetomotive force, as the case may be.

In the particular case of the Strohm patent, although FIG. 1 of the Strohm patent implies magnetic flux vectors (B) in opposition to each other, thereby appearing to lead to the desired production of electromotive force or magnetomotive force in conductive elements (when they are translating through said B fields), the complete flux paths and interlinkages are not depicted nor discussed. Accordingly, once the complete flux paths/interlinkages are studied and examined, it is found that perfect electromotive force or magnetomotive force cancellation takes place once again, in almost an identical fashion as in Neag above, due to the interaction of the peripheral series conductor with said completed flux paths/interlinkages. Due to this unfortunate outcome, Strohm's later attempts at the series summation of a plurality of said translating conductive elements will most likely also fail.

In U.S. Pat. No. 5,977,684 to Lin, there will be a lack of desired induced electromotive force (or produced magnetomotive force) due to the fact that the uniform/symmetric axial magnetic flux field will not co-rotate at the input shaft angular velocity, but rather, it will appear to be stationary in the machines rotational (non-inertial) reference frame. Hence, there will not be a "moving" (i.e., rotating) magnetic flux field interacting with active conductor segments in one area, and a "non-moving" (i.e., static) magnetic flux field that is not interacting with series connecting conductor segments in another area. There will only exist static magnetic flux fields.

In summary, for the cases of related art pertaining to the class of electromechanical power converters termed as being of acyclic topology (and homopolar), the methods known and disclosed for series summation as in Group 2 are mostly impractical, and those known and disclosed as in Group 3 are not viable, and have thus contributed to maintaining the image of the acyclic homopolar converter as solely a low-impedance device.

In the past the practical use of acyclic (homopolar) motors and generators has been inhibited by the large voltage drop of conventional graphite-based electrical brushes. Recently, at least in principle, microfiber brushes and hybrid (metal/liquid) brushes, have promised to remove this previously critical bottleneck. However, there are still other problems to overcome. The first obstacle against the widespread use of acyclic (homopolar) machines has been the need for a large number of brushes and brush holders (due to the still very high currents to be handled because of low rotor impedance.) The second obstacle is a very low machine voltage (or rotor impedance), due to the low voltage (electromotive force) per current "turn" or path. For example, passage of current through an active conductive rotor element moving in a magnetic field, for known acyclic (homopolar) machines, rarely exceeds 20 volts per turn. This condition necessitates the use of several to many "turns" or paths, and hence a multiplicity of brushes, brush holders and slip-rings, in order to attain a practical voltage of at least several hundred volts for the overall machine.

To further provide background teaching, the points raised in one of the most comprehensive treatments of homopolar power converter structures (and heteropolar structures as well) published, given by Levi and Panzer in, "Electromechanical Power Conversion" [1974], pp. 152-200 (ch. 5, "Homopolar Converters") and pp. 201-254 (ch. 6, "Power Conversion in Heteropolar Structures: Synchronous Converters with Uniform Air Gap".), should be considered.

From the outset, in "Electromechanical Power Conversion" [1974], at p. 8 in the "Introduction", Levi states " . . . in Chap. 5 . . . . We find the homopolar converter to be inherently a low-voltage, high-current device . . . . In seeking to overcome the low-impedance limitations of the homopolar converter, we discover in Chap. 6 the advantages arising from a heteropolar configuration".

In studying Levi above, we find that Chapter 5 deals most thoroughly with the symmetry aspects of cylindrical rotary homopolar structures and some of the unique characteristics associated therewith, for example, because of this symmetry, the induced Magnetic (B) field in a homopolar machine does not generate any motional electric field and that this property is peculiar to homopolar structures, and is not shared by any other structures. Further, the "armature reaction" experienced in a homopolar machine is different than that in all other structures (topologies), so that the homopolar structure is unique and at an advantage compared to other types, in that saturation effects can be easily avoided and almost completely screened out in such homopolar structures.

Chapter 5 also concludes that the homopolar machine is of high-speed, large magnetic (B) field, low-voltage, high-current; and hence inherently low-impedance in nature. Some of the final assumptions given in the summary of Chapter 5, state that, " . . . we have studied the converter type which has the greatest symmetry and uniformity: the homopolar converter." and 1.) "The electrical and mechanical performance of the converter as a whole essentially parallels that of a single volume element." and 2.) "Efficiency considerations limit this application to velocity intervals in the neighborhood of the drift velocity." and 4.) "When saturation effects are negligible, the armature reaction in endless structures does not affect the terminal voltage . . . ". The treatment of homopolar machines in Chapter 5 are typical of the treatment given to, and classification of, homopolar structures.

At the beginning of Chapter 6, p. 201, Levi states, "We begin by seeking means to overcome the rigid relation between voltage and physical dimensions in the homopolar converter, and trace the source of this inflexibility in impedance level to the uniformity of the field distribution . . . ". Subsequently, on pp. 203-207, he states that "the inherent low-impedance of the homopolar converter cannot be overcome in that series summation of the electromotive force in active conductor segments cannot be accomplished." This argument is also mentioned in further detail elsewhere in the Levi text. Essentially, Levi categorically states that the inherent problem of "bucking" or electromotive force cancellation in series connections cannot be overcome in homopolar machines, hence the subsequent diversion to heteropolar machinery (those producing AC). Levi does touch upon the "Gramme ring winding", which does effect a specific form of flux "steering" and flux "isolation", when used in a heteropolar structure in order to effect series summation. Levi indicates that only heteropolar converters are capable of impedance-matching, due to their exclusive ability to use series summation for active conductors.

In the summary of Chapter 6, Levi concludes, 1.) "The low electric impedance of the homopolar converter is inescapable. This drawback has to be overcome by resorting to polarity alternations in the gap B [field], so as to permit increased voltage by series connection of individual armature conductors. An immediate consequence of this heteropolarity is the establishment of AC quantities in the external circuit.", and also, 2.) " . . . [in heteropolar converters] . . . the average or net power per-unit surface cannot reach the same ultimate levels as in homopolar converters." [bracketed italics are the inventors additions].

We refer to Levi's treatment of the subject matter as being representative of the typical arguments and currently dominant opinions proffering the necessity, desirability and superiority of heteropolar structures over homopolar structures. However, we also note his statement of several unarguable peculiarities and advantages exhibited even by the known classical low-impedance homopolar structures.

Throughout Levi above, homopolar really meant acyclic and homopolar; one can have a homopolar structure that is not acyclic, for example, the eddy current brake on a watthour meter. To be acyclic means to be inherently homopolar.

It is thus an object of the present invention to provide for an internal impedance converting electromechanical power converter that uses a conductive shell with superconducting conductors in series to achieve high impedance output.

BRIEF SUMMARY OF THE INVENTION

An electromechanical power converter comprising a frame having field coils and a shaft disposed between the field coils, a rotor assembly having a conductive shell, said rotor assembly coupled to said shaft, a first conductor made from superconducting material and in series electrical contact with said conductive shell, and a second conductor made from superconducting material and in series electrical contact with said conductive shell.

BRIEF DESCRIPTION OF THE DRAWINGS

The invention will be described by reference to the following drawings, in which like numerals refer to like elements, and in which.

Figure 1:
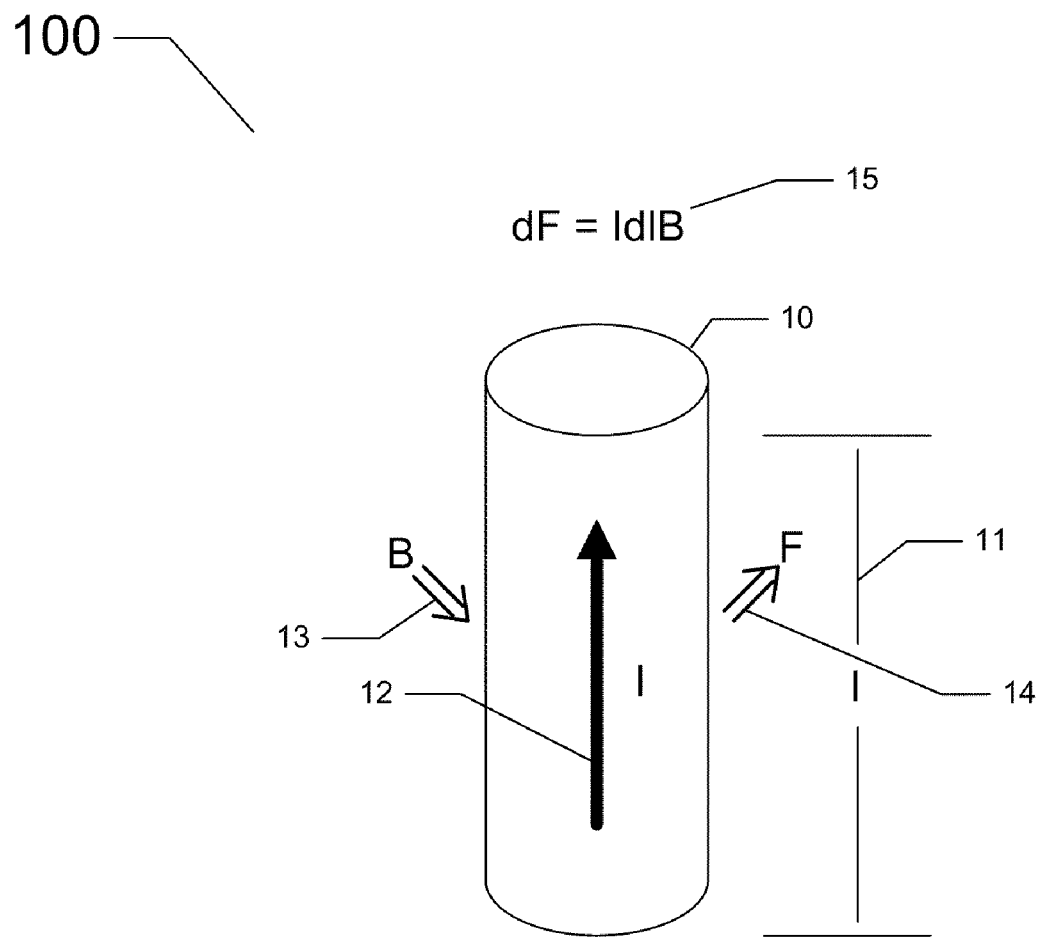
FIG. 1 is a schematic representation of the classical electrodynamic concept of magnetomotive force (MMF) produced by a current flowing along a conductive element located within a uniform perpendicularly applied magnetic field.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the claims herein.

DESCRIPTION OF THE PREFERRED EMBODIMENTS

For a general understanding of the present invention, reference is made to the drawings. In the drawings, like reference numerals have been used throughout to designate identical elements.

Overview of Electrodynamic Concepts

A brief overview of electrodynamic concepts is presented here to fully enable one skilled in the art to make and use the invention.

Shown in FIG. 1 is an illustration of the classical electrodynamic concept of current flow produced magnetomotive force (MMF) over the length of a conductive element located within a uniform perpendicularly applied magnetic field. In this figure, there is a conductive element 10, of length "l" 11, said conductive element 10 having a current flow "I" 12 therein along its length "l" 11, and being situated in a uniform externally applied magnetic (B) field 13. The current flow "I" 12 (which is due to a current density J comprised of moving charge carriers, nominally q- or electrons in this case) experiences a net force "F" 14 in a vector direction mutually perpendicular to the "B" field vector 13 and the current flow "I" direction 12. This force "F" 14 is transferred or coupled to the more or less rigid lattice of the conductive element 10 via the classical viewpoint of collisions between the electrons comprising said current flow "I" 12 and the lattice of said conductive element 10, said conductive element 10 thereby indirectly experiencing the net force "F" 14. This is usually referred to as the "Lorentz force" and is given by the differential equation dF=I dlB which is depicted as expression 15 in FIG. 1. The quantum electrodynamic viewpoint of force coupling between the charge carriers and the lattice involves wavefunction interactions and eliminates eventual problems with the simplistic classical viewpoint (such as accounting for superconductivity above absolute zero etc.)

The reason the moving charges experience the Lorentz force is that the magnetic field of a moving charge interacts with the applied magnetic field, resulting in a change in the moving charge trajectory (with no gain or loss of kinetic energy.) In the presence of an accelerating electric (E) field such as is found in a conductive element across the length of which an electromotive force potential is applied, the charges gain kinetic energy in the general direction of the applied E field vector, which in the absence of an externally applied magnetic field is usually given up to or lost to or transferred to the lattice (via collision or wavefunction interaction), said kinetic energy gain by the lattice (which is totally random) resulting in simply an increase in its temperature (vibration, phonon transfer etc.) This is normally referred to as "Joule heating" or "Joule loss". However, upon the application of an external magnetic field, the moving charges modify their trajectory into a "cycloid" between lattice interactions, said cycloid trajectory having a net vector that is mutually perpendicular to the direction of said applied magnetic field and to the direction of displacement due to said E field vector and resultant net current flow.

Figure 2:
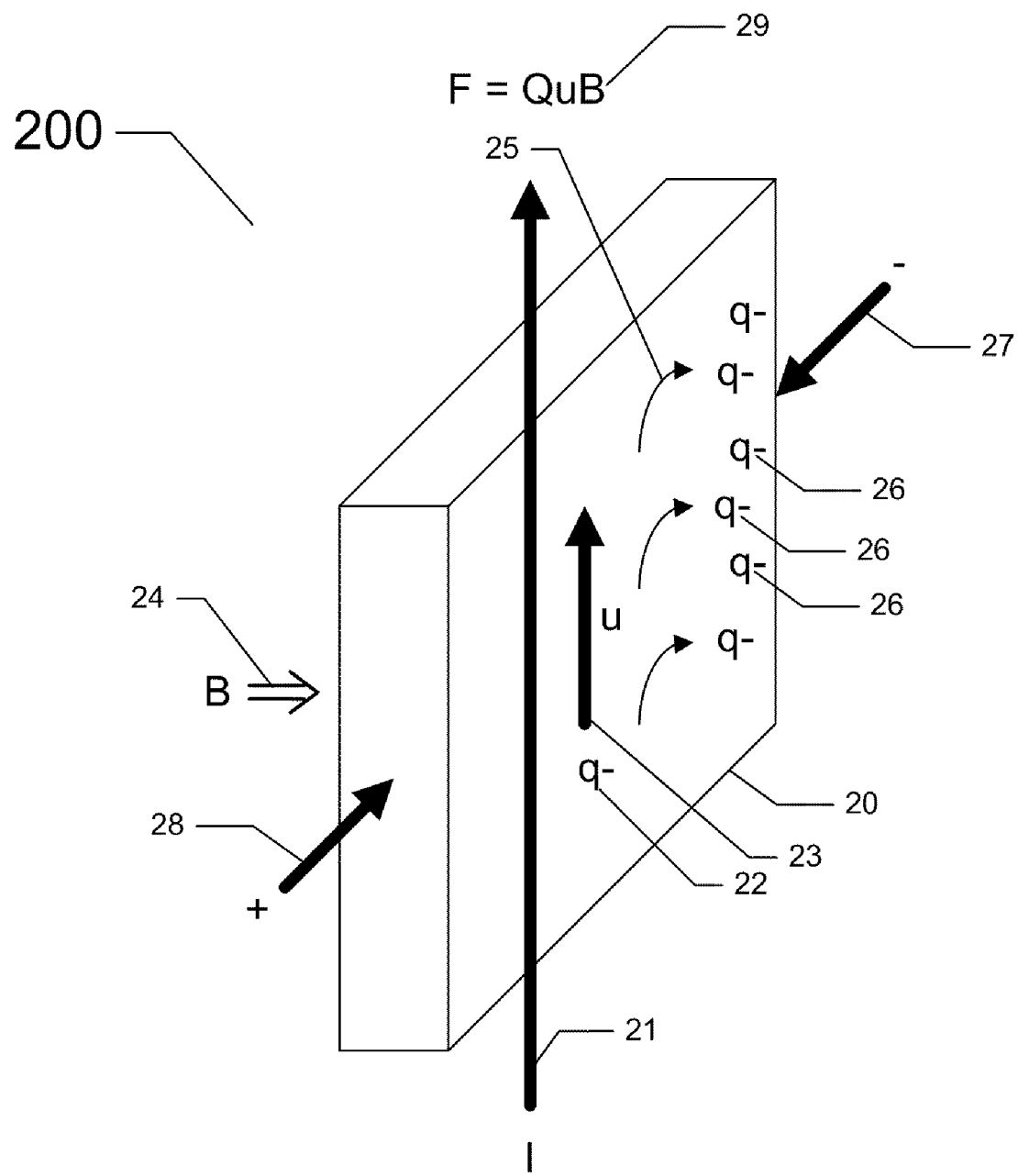
FIG. 2 is a perspective schematic representation of the Hall effect in a rectangular and planar conductive element located within a uniform perpendicularly applied magnetic field.

Referring now to FIG. 2, a perspective schematic representation of the Hall effect in a rectangular and planar conductive element located within a uniform perpendicularly applied magnetic field is illustrated. The Hall effect is directly due to the Lorentz force described by way of FIG. 1 above. As shown, there is a substantially rectangular and planar electrically conductive element or sheet 20, having a net current flow "I" 21 therein/through, said current flow "I" 21 consisting of a multitude of moving charge carriers "q-" 22 (i.e., electrons), moving at a nominal displacement (or drift) velocity "u" 23, at right angles to an externally applied uniform magnetic field "B" 24. The Lorentz force interaction causes trajectory modification 25 to said multitude of moving charge carriers "q-" 22, resulting in a net accumulation 26 of said negative charge carriers at one end of said element 20. In this case, the Lorentz force interaction of said charge carriers is given by F=QuB which is depicted as expression 29 in the drawing figure.

Correspondingly, if an electromotive force potential (EMF) measurement were to be made transversely across the element 20, at the points 27 and 28 indicated in the drawing, one would measure an electromotive force potential or gradient due to said imbalance in negative charge carriers across said element 20, leading to a positive potential at point 28 and a negative potential at point 27. This potential is also referred to as the "Hall voltage" or "Hall potential". A net force will also be felt by the lattice due to the above. The Hall voltage is usually not easily observed nor considered in circular conductors as used in electrical machinery because it is very, very small. In addition, the Hall effect is the source of eddy currents or Foucalt currents when a conductive element is in motion in a magnetic field.)

Figure 3:
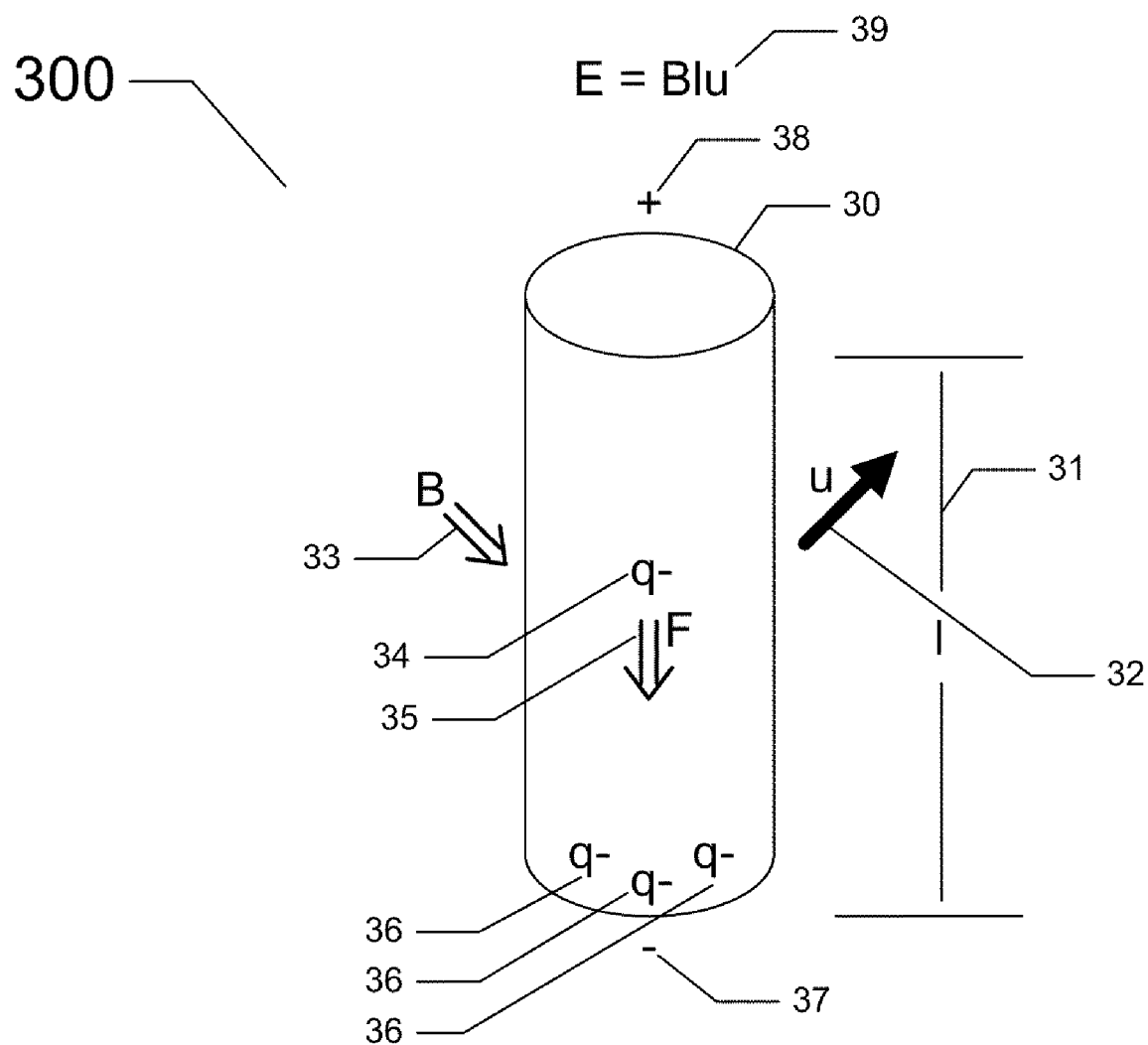
FIG. 3 is a schematic representation of the classical electrodynamic concept of electromotive force (EMF) that is produced along the length of a conductive element that is translating through a uniform perpendicularly applied magnetic field.

Referring now to FIG. 3, a schematic representation of the classical electrodynamic concept of electromotive force (EMF) that is produced along the length of a conductive element that is translating through a uniform perpendicularly applied magnetic field is depicted. There is shown a conductive element 30, having a length "l" 31, said element 30 being in uniform perpendicular translation at velocity "u" 32, through an externally applied uniform magnetic field "B" 33. Said conductive element 30 contains negative charge carriers q- 34 (here presumed to be electrons, i.e., Fermi gas of electrons etc.) which are free to move around within the lattice of said conductive element 30.

The charge carriers 34 experience the Lorentz force interaction "F" 35 (as previously described by way of FIGS. 1 and 2), and lead to an accumulation of negative charge carriers 36 at one end of the conductive element 30. The net effect of this will be an observable electromotive force (EMF) potential across the ends of conductive element 30 of length "l" 31 while it is in motion through said magnetic field "B" 33, said electromotive force potential being positive at one end 38 (due to a deficiency of negative charge carriers) and negative at the other end 37 (due to an excess of negative charge carriers.)

The magnitude of said electromotive force potential due to the Lorentz force interaction of the charge carriers is given by E=Blu which is depicted as expression 39 in FIG. 3. (Note: in the absence of a continuous (closed) current path to the outside of the conductive element, the lengthwise displacement of negative charge carriers will continue until the Coulomb force due to the electromotive force potential gradient within the conductive element just balances out the Lorentz force interaction.)

Figure 4:
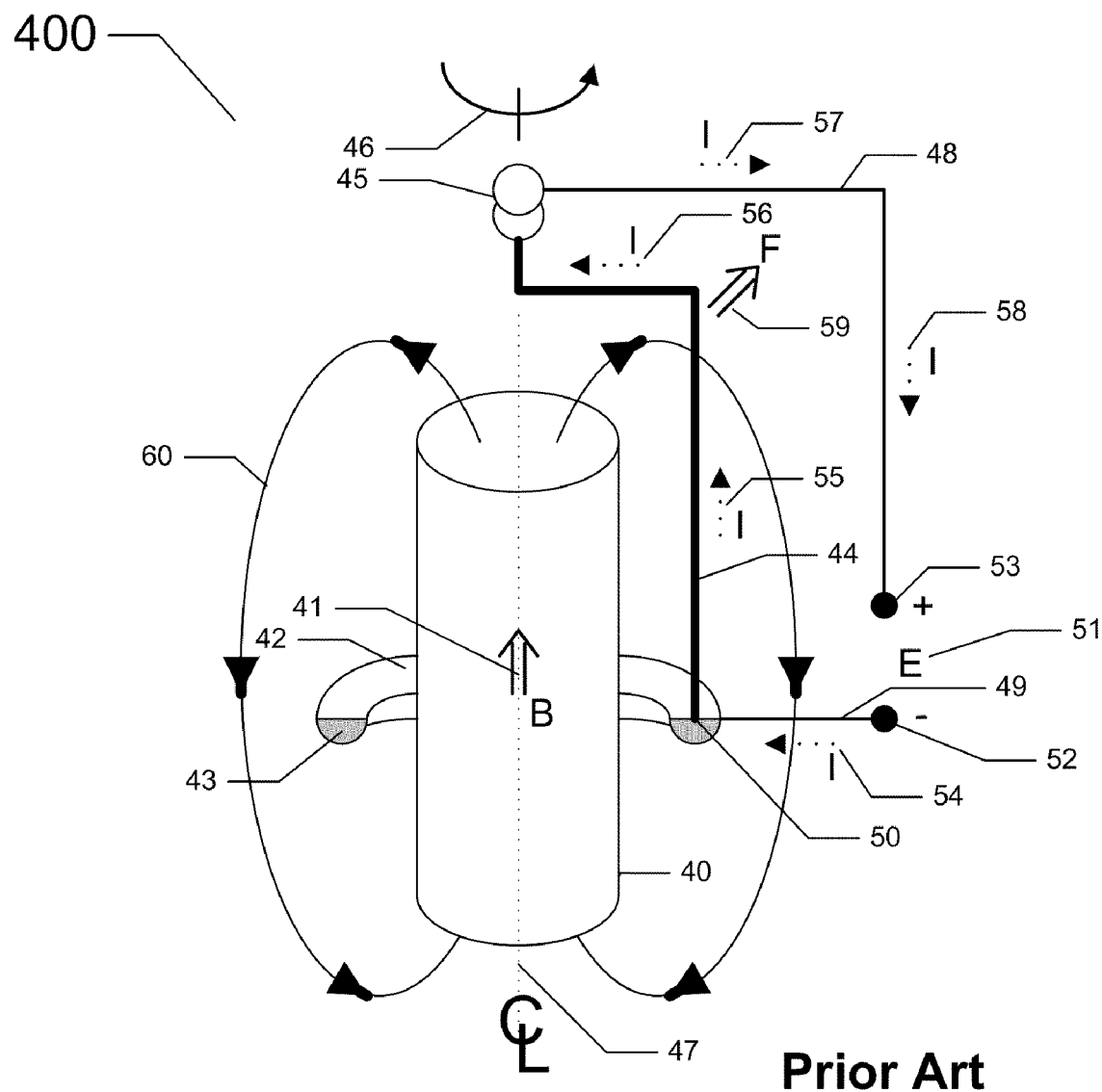
FIG. 4 is a schematic representation of a prior art homopolar and acyclic apparatus according to Faraday.

Referring now to FIG. 4, a schematic representation of a prior art homopolar and acyclic apparatus according to Faraday is shown. This apparatus is considered to be the world's first rotary electromagnetic machine. Shown is a magnetically permeable member 40, such as a permanent magnet, producing a magnetic flux field 41 about said member 40. The flux field 41 can be seen to be radially symmetric and uniform (about centerline 47) as shown by artificial flux field lines 59 and 60. Said member 40 is surrounded by a trough 42 containing an electrically conductive liquid 43 (such as Hg.) An electrical conductor 44 is suspended from an electrically conductive swivel joint 45 in such fashion as to be able to freely rotate about said centerline 47 of said magnetically permeable member 40, and hence is free to translate through (rotate therethrough) said member 40's magnetic flux field as indicated by 46.

An electrical circuit is next completed through this apparatus, wherein the bottom end of said electrical conductor 44 makes contact with (dips into) the conductive liquid 43 in trough 42 at 50, and is brought out to a negatively denoted terminal 52 via stationary conductor 49 which is also in contact with said conductive liquid 43. The top end of electrical conductor 44 is connected via said electrically conductive swivel joint 45 and stationary conductor 48 to a positively denoted terminal 53.

The operation of this prior art apparatus will now be described with the aid of the above described FIG. 4. A source of electromotive force 51 (EMF) is applied across said terminals 53 and 52, these being positive and negative respectively. Consequently, an electric current will flow through the apparatus, as shown by "I" 54, from said negative terminal 52 through said conductor 49, into said conductive liquid 43, then through said electrical conductor 44 as shown by "I" 55 and "I" 56, then through said swivel 45 and finally through stationary conductor 48 as shown by "I" 57 and 58 to said positive terminal 53. The vertical flow of current "I" 55 and 56 in electrical conductor 44 (which is free to rotate) leads to said electrical conductor 44 experiencing the Lorentz force "FF" 59, in the same manner as was described in FIG. 1 above. Since said electrical conductor 44 is constrained to rotate or swivel only about said centerline 47 of the uniform and radially symmetric magnetic flux field 41, 59 and 60, said electrical conductor will perform a continuous uniform rotational translation thereabout, in essence performing the conversion of electrical power into mechanical work, by utilizing the Lorentz force interaction as a force vector modifying intermediary. The apparatus of FIG. 4 is essentially a rotary electromechanical power converter known as a motor. Further, the apparatus performs work without requiring commutation or switching of said electric current flow, and does not exhibit any time-variant electrodynamic interactions (on the macroscopic scale), and is homopolar in form and is also acyclic in nature and action. This apparatus is reciprocal, where it will generate an electromotive force when driven mechanically.

Figure 5:
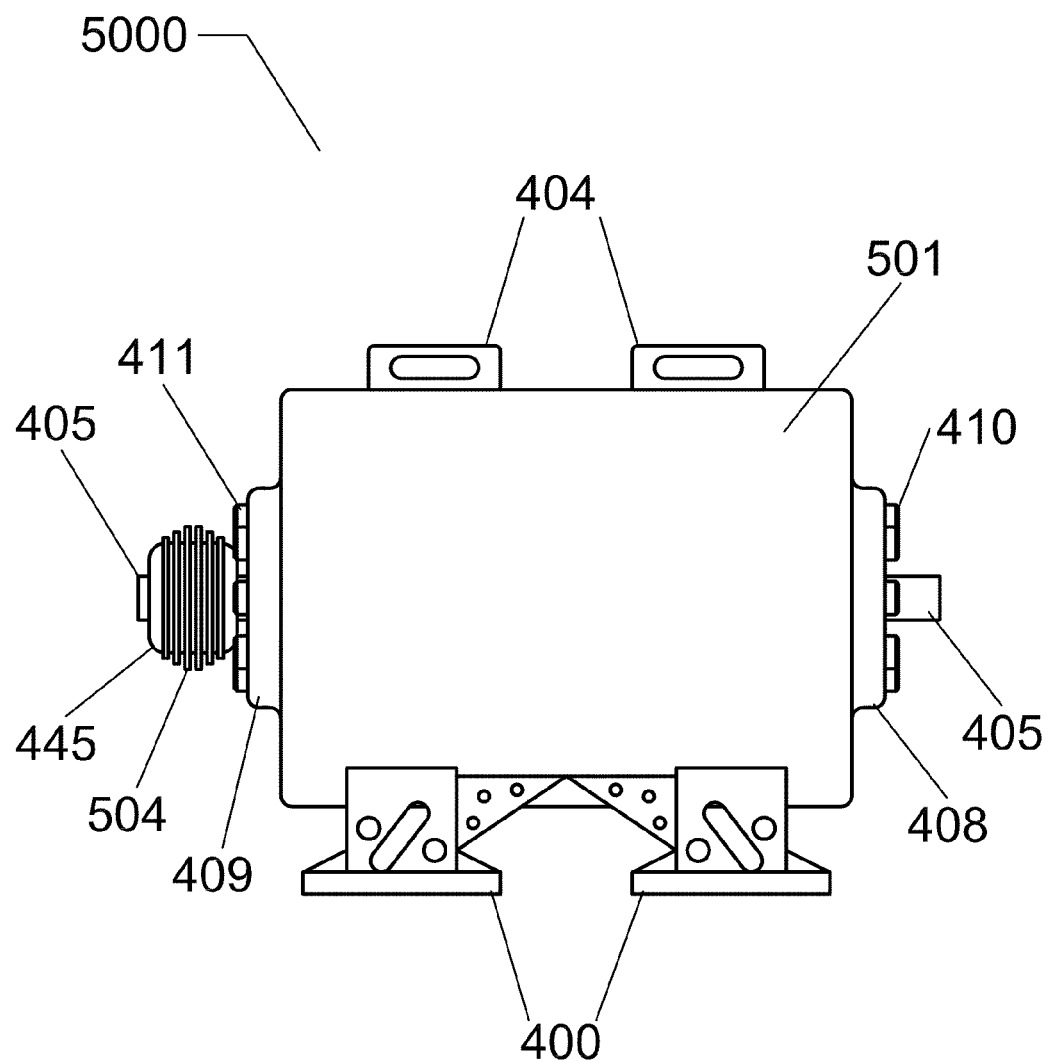
FIG. 5 is a side view of the Internal Impedance Converting Superconducting Acyclic Power Converter.

Referring now to FIG. 5, a side view of the Internal Impedance Converting Superconducting Acyclic Power Converter is shown. A frame 501 provides mechanical integrity to the inner workings of the electromechanical power converter, and may be made from a metal such as iron, steel, brass, or the like. The frame 501 may also be connected to a stand 400 for mounting and support of the electromechanical power converter. Frame hooks 404 may also be provided in some embodiments of the present invention to assist with moving and placement of the electromechanical power converter. Also shown in FIG. 5 is a shaft 405, end caps 408 and 409, bolts 410 and 411, and a cryocooler 445 with fins 504. Each of these elements will be further described by way of subsequent drawings that clearly illustrate the inner workings of the electromechanical power converter in such a way as to allow one skilled in the art to make and use the invention.

Figure 6:
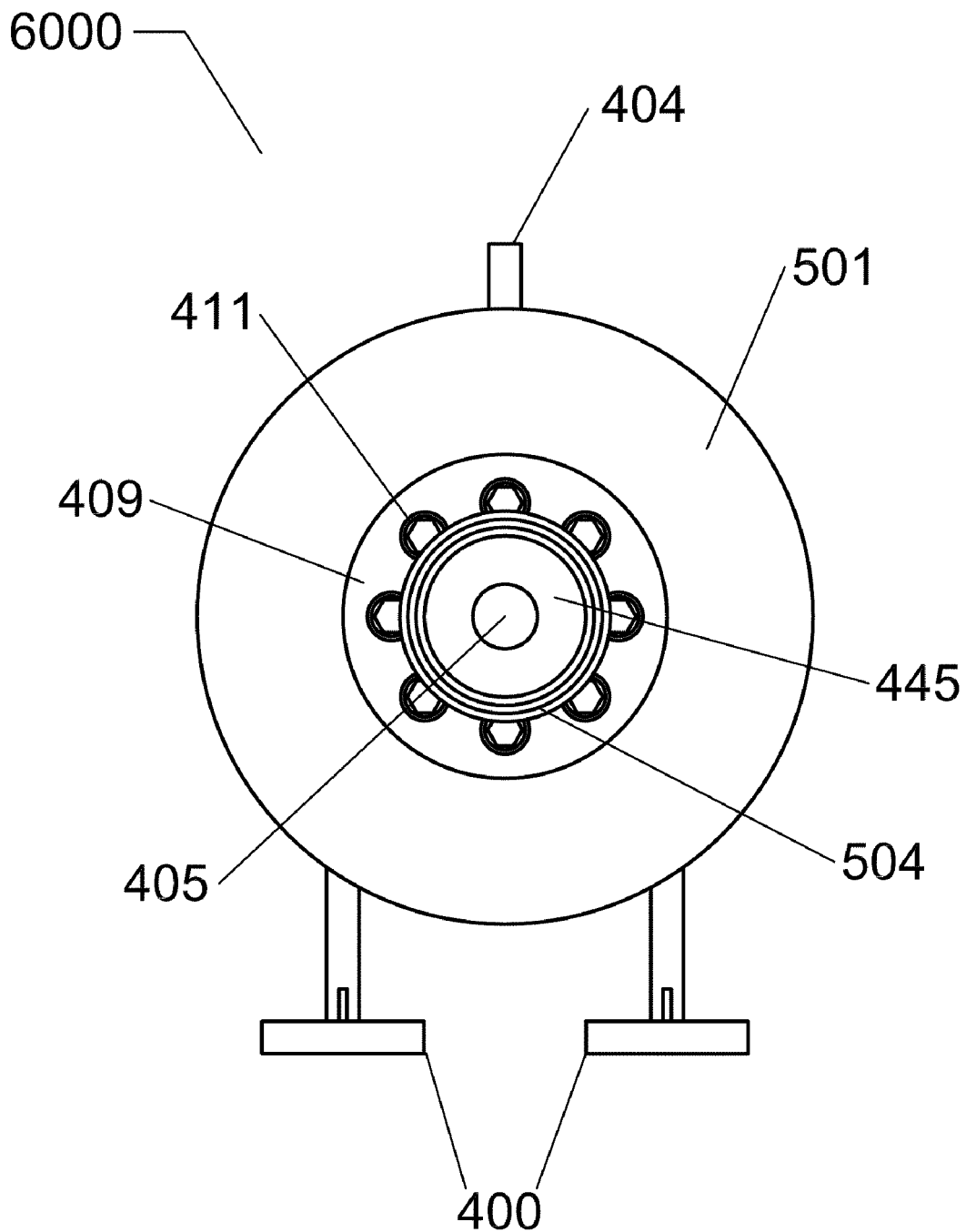
FIG. 6 is an end view of the Internal Impedance Converting Superconducting Acyclic Power Converter.

Referring now to FIG. 6, an end view of one embodiment of the Internal Impedance Converting Superconducting Acyclic Power Converter is shown. A cryocooler 445 is depicted with cryocooler fins 504. The crycooler 445 in some embodiments of the present invention co-rotates with the shaft 405, and serves to cool superconducting connections within the electromechanical power converter. A cryocooler is a low temperature refrigerator used to cool, for example, infrared detectors, medical instruments, and superconducting devices. Cryocoolers are known to those skilled in the art. Examples of cryocoolers are those made by Janis Research (www.ianis.com), Shi Cryogenics (shicryogenics.com), and Ball Aerospace (www.ballaerosnace.com). FIG. 6 also shows several mechanical features of the acyclic power converter such as the frame 501, stand 400, frame hooks 404, end cap 409 and end cap bolts 411. These mechanical features may be modified, omitted, or added to without departing from the spirit and broad scope of the present invention as described herein.

Figure 7:
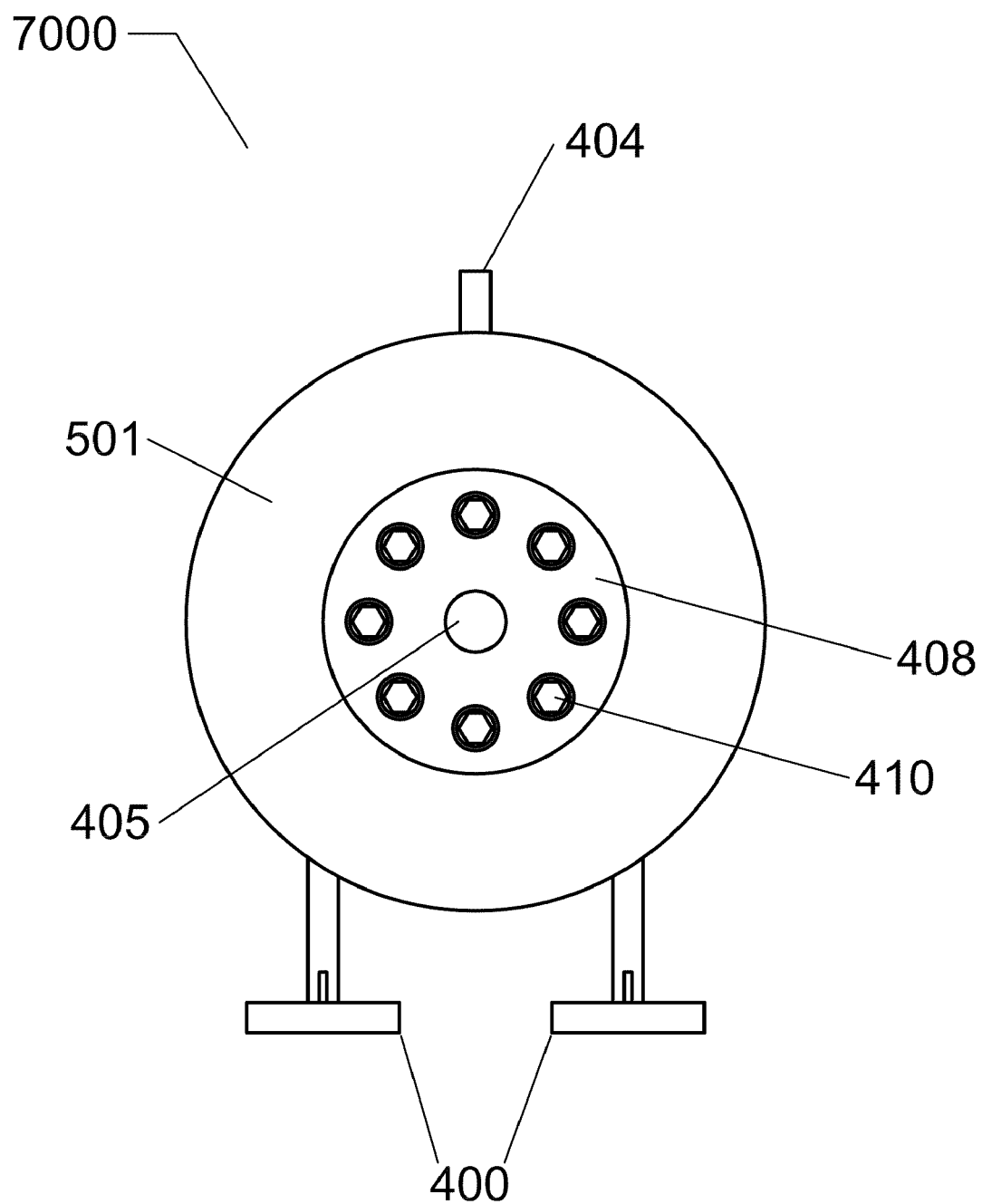
FIG. 7 is an opposing end view of the Internal Impedance Converting Superconducting Acyclic Power Converter.

Turning now to FIG. 7, an opposing end view of one embodiment of the Internal Impedance Converting Superconducting Acyclic Power Converter is shown. The frame 501 may contain a stand 400 and, in some embodiments of the present invention, hooks 404, and end caps, with end cap 408 being visible in FIG. 7. End caps may be made from a metal such as steel, iron, brass, or the like. The end cap 408, as will be further described later in this specification, serves to retain bearings and the shaft 405. The shaft 405 may be made from a ferromagnetic material such as steel, hardened steel, iron, or the like. The shaft 405 provides a mechanical interface between mechanical energy and electrical energy. The end cap 408 is retained by a series of bolts 410.

Figure 8:
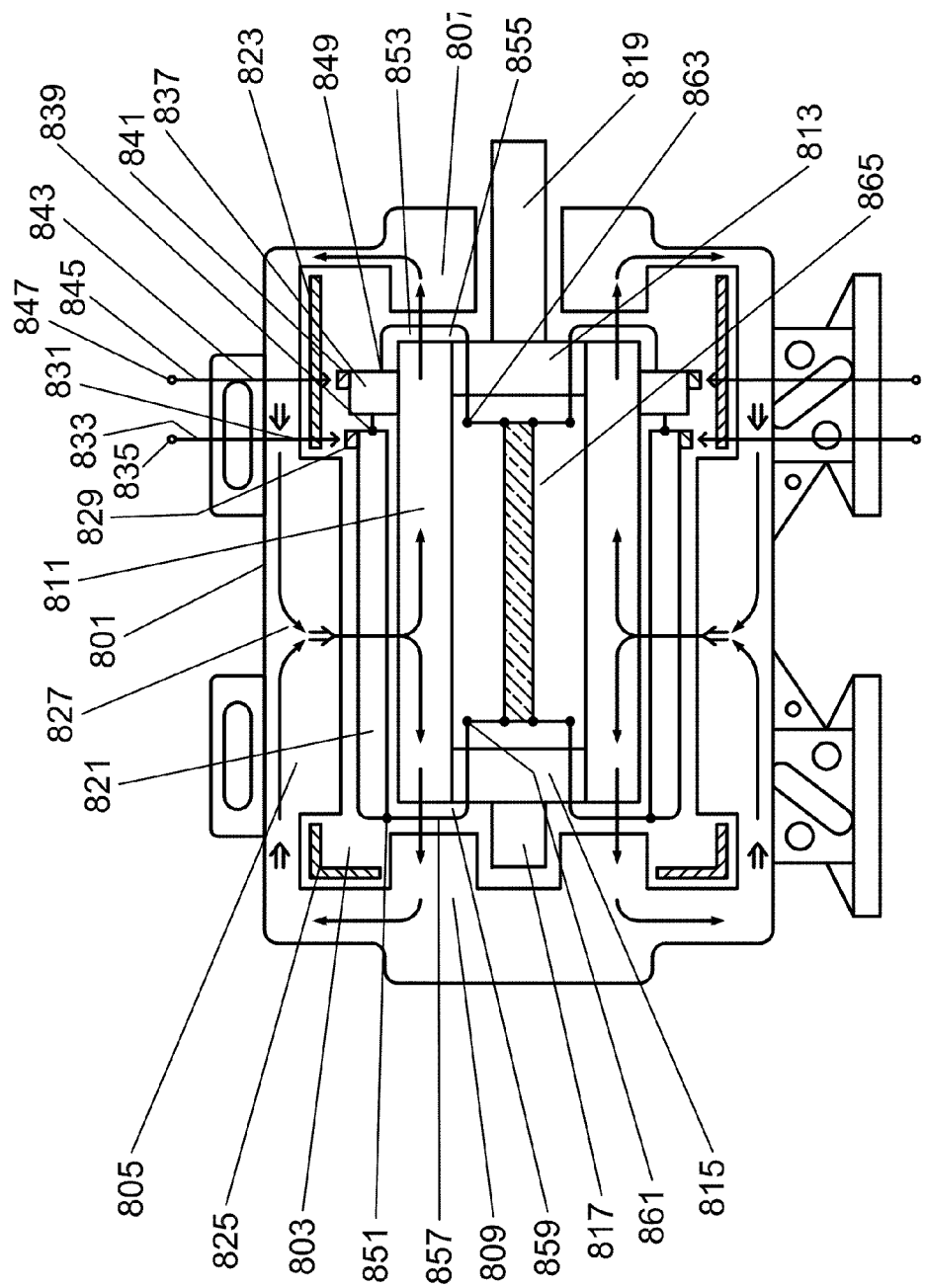
FIG. 8 is a cutaway view of one embodiment of the Internal Impedance Converting Superconducting Acyclic Power Converter.

To fully understand the inner workings of the Internal Impedance Converting Superconducting Acyclic Power Converter, the remaining figures provide cutaway views with various components removed for clarity. FIG. 8 is a cutaway view of one embodiment of the Internal Impedance Converting Superconducting Acyclic Power Converter showing the inner components intact. Some components are hidden from view in this figure, but will become clear in progressive illustrations as various internal components are progressively removed for illustrative purposes.

Referring now to FIG. 8, a cross sectional view of one embodiment of the present invention is depicted. In FIG. 8, power conversion electronics are facilitated anterior to the rotor, and superconducting elements are utilized within two airgap regions and through two solid magnetically permeable regions.

With reference to FIG. 8, there is shown a first embodiment of an Internal Impedance Converting Superconducting Acyclic Power Converter." In structure it is similar or can be made very similar to the well-known "double-end fed drum type" acyclic/homopolar topologies.

The stator 801 is comprised of conventional high-permeability material such as cast iron or the like, and is formed to have an interior annular space 803, with an equatorial interior circumferential pole face 806 and a first interior circumferential end pole face 807 and a second interior circumferential end pole face 809. Into said interior annular space 803 is placed a drum shaped rotor assembly 811, comprised of conventional high-permeability material such as cast iron or the like. Said drum shaped rotor assembly 811 is supported at each end via a first end support 813 and a second end support 815, such as, for example, spiders or discs, which are also comprised of conventional high-permeability material such as cast iron or the like. Attached to said end supports 813 and 815 are a first shaft 817 and a second shaft 819. Said shafts 817 and 819 are comprised of conventional magnetically permeable material such as steel or the like. Shaft 819, as shown, is considered as an output/input shaft, with shaft 817 being hidden/blind in this embodiment. In other embodiments of the present invention, the shaft 817 may be visible, exposed, or otherwise configured.

Said drum shaped rotor assembly 811 has attached to its anterior surface a high-conductivity (electrical/low-resistance) shell 821 that may be annular in shape and of suitable thickness, and comprised of, for example, copper. Attachment to the drum shaped rotor assembly 811 may be by way of heat shrinking or adhesive bonding, mechanical pegging or riveting, fasteners, or the like. It can be seen from the drawings that the high-conductivity shell 821 is located within the magnetic air gap between the equatorial interior circumferential pole face 805 and the drum shaped rotor assembly 811. The high-conductivity shell 821 co-rotates with the drum shaped rotor assembly 811.

Also shown located within said annular space 803 within the stator 801 are a first electromagnetic field coil 823 and a second electromagnetic field coil 825, whose windings and connections are such, so as to provide for the production of magnetic flux (B-field) as depicted by the flux vector arrows 827 (electrical connections to coils not shown. Preferentially, the B-field should be just into the saturation region of magnetic materials. Although the field coil constructs as depicted here are not symmetrical, the flux density across pole face 160 should be more or less uniform.)

This embodiment will now be described in more detail, presuming its use as a generator first (for the generation of EMF), and then secondly as a motor (for the generation of MMF.)

According to well known electrodynamic principles, the translation of a conductor (in this case, the rotation of the high conductivity shell 821) within such a uniform B-field will lead to the establishment of an EMF potential across the ends of the high conductivity shell 821 due to the Lorentz force exerted upon the free charges within the high conductivity shell 821. The magnitude and polarity of said EMF, is of course, a cross product of the velocity, B-field density and conductor length. As an example of the magnitude of the motional EMF generated in accordance with the above, a conductor (for example, the high conductivity shell 821) having a length of 1 meter, translating in a B-field of 1 Tesla (10,000 gauss) with a velocity of 1 meter sec-1 would provide an EMF potential of 1 Volt across its ends.

To increase EMF potential, several things need to be considered. Using conventional field coils or even using superconducting coils, the B-field limit will be determined by the saturation characteristics of the stator and rotor drum material (typically to less than 1.5 Tesla.) And acceptable machine dimensions will constrain both length and diameter in practice, hence lengths may lie in the range of one to five or so meters and diameters may range from one to five or so meters.

Combining the above with normal rotational velocities in the 1200 to 3600 RPM range will result in fairly low EMF's, e.g., 20 to 200 Volts. The limit to the amount of current from such a generator at such low voltages is at first glance determined by the resistance/impedance of the high conductivity shell 821. Accordingly, one would refer to this type of machine as being of "low-impedance". However, in practice, the losses incurred by current-collector assemblies and methods (brushes, slip-rings etc.) by far become the limiting factors in the actual output voltage and current from such a machine, with concordant large reductions in efficiency.

As the real world desires "high-impedance" machines, the above described topology, has in the past, been driven at very high peripheral velocities (i.e., from a turbine, 20,000 RPM+) in order to increase EMF in the first instance, however mechanical difficulties and frictional brush losses became dominant.

Another approach was to increase the B-field to very large values while remaining at normal peripheral velocities. This has been accomplished through the use of superconducting field coils and the elimination of magnetically permeable material in the first instance. In such a case, saturation effects disappear, and B-fields on the order of 5+ Tesla can be sustained. However, the cost and complexity of such superconducting field coils warranted this approach inadequate.

It is therefore desirable for this type of "simple" power converter topology to become compatible with real world demands, for example, the output (in the case of a generator) must appear to be of high-impedance.

Accordingly, the present invention and its various embodiments achieve this goal through the novel topologies described herein. With reference again to FIG. 8, there is disposed a slip ring 829 at one end of the high conductivity shell 821 that is in good electrical contact therewith. Electrical contact may be made; for example, by soldering, brazing, mechanical attachment, and the like. In sliding contact with the slip ring 829 is a current collector 831 that is made from, for example, composite graphite, carbon, copper brush, and the like. This current collector 831 is brought out to the exterior of the stator 801 by way of the current lead 833 to terminal 835, of which there may be a multiplicity.

Also disposed peripherally on the anterior of said drum shaped rotor assembly 811 are power conversion electronics 837, such power conversion electronics being known to those skilled in the art, and being electrically connected to the slip-ring 829 end of the high conductivity shell 821 via connection 839.

A second slip ring 841 is provided that is electrically connected with the "output" of the power conversion electronics 837 and is in sliding contact with a second current collector 843 being brought out to the exterior of the stator 801 via the second current lead 845 to second terminal 847 of which, in some embodiments of the present invention, there may be a multiplicity. Further, power conversion electronics 837 are connected via a third terminal 849 and operatively connected to the other end of the high conductivity shell 821.

The purpose of the power conversion electronics (inverter) 837 is to provide a "high-impedance" output (i.e., high voltage, low current) from a "low-impedance" input (i.e., low voltage, high current.) Such a circuit topology is considered an inverter, and is known to those skilled in the art.

The three-terminal configuration depicted in FIG. 8, that is elements 829, 841 and 849, will be further described such that one skilled in the art will be enabled to make and use the invention and its various embodiments.

The potential at slip-ring 829, current collector 831, current lead 833, terminal 835 and connection 839 are all at 0 volts (common.) The third terminal 849 is deemed to have available (with respect to 0 volts/common) a low impedance energy source (for example, 100 V@10 kA may by example be considered low impedance) and said power conversion electronics 837 transforms/inverts this to, for example 8 kV@125 A. This latter output would be deemed high impedance and suitable for real world interfacing. In this example case, the current collector losses at 831/829 and 843/841 would comprise about 2.5 volts×125 amps×2 for a total of about 625 watts (out of @1 megawatt.) In contrast, the usual "low-impedance" form of construction of this topology would have incurred current collector losses greater than 5 volts×10 kiloamps×2=100 kilowatts or more.

The presumption above that said power conversion electronics 837 receive low impedance across connection 839 and third terminal 849 is predicated on the electrical connections from either end of said high conductivity shell 821. The one end is directly connected via connection 839 and hence exhibits no/zero EMF induction (whether constructive or destructive.) However, the other end connection 851, via second conductor 857 (a multiplicity thereof), must traverse all the flux across second gap 859 during rotation there through. This conductor would experience motional EMF induction that is opposite to that which is desired.

Likewise, third terminal 849 via first conductor 853 (a multiplicity thereof), must traverse all the flux present in first gap 855 during rotation there through. This conductor would also experience a motional EMF induction that is opposite to that which is desired. In fact, between the first conductor 853 and the second conductor 857, their induced motional EMF will summate to that which is induced in the high conductivity shell 821, but of opposing polarity, providing for a sum of net zero (EMF cancellation.) This being the actual occurrence if "normal" electrically conductive materials, such as, for example, copper, are utilized for first conductor 853 and second conductor 857.

The electrical connections 861, 863 and annular connector 865, located within the interior of the drum shaped rotor assembly 811, are devoid of any induced motional EMF, since they are not exposed to any B-field/flux and hence are considered electrically neutral, except for their conductivity/resistance.

However, in order to achieve the object of the present invention, conductors 853 and 857 are comprised of suitable high temperature superconducting material (typically of bulk type, not conductive matrix type; as a conductive matrix of, for example, silver or gold, would be self-defeating.) In some embodiments of the present invention, low temperature superconducting material may be used. This form of conductor will provide flux exclusion at temperatures below Tc and within a flux density below Hc and at currents sub-Jc. Accordingly, no reverse EMF is provided by said conductors 853 and 857.

Figure 9:
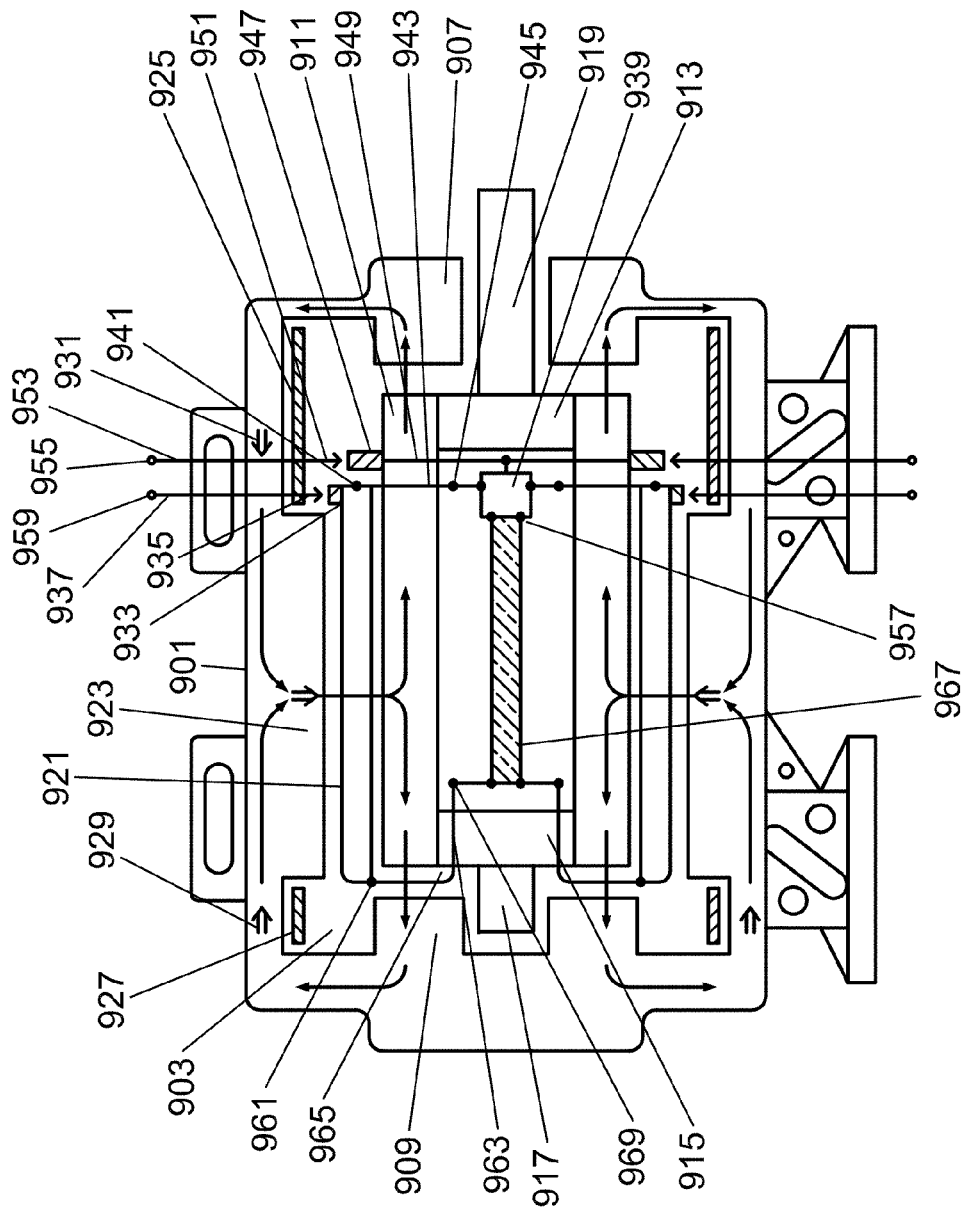
FIG. 9 is a cutaway view of a second embodiment of the Internal Impedance Converting Superconducting Acyclic Power Converter.

With reference to FIG. 9, there is shown a second embodiment of an internal impedance converting superconducting acyclic power converter. In structure it is similar to the well-known "double-end fed drum type" acyclic/homopolar topologies.

The stator 901 is comprised of conventional high-permeability material such as cast iron or the like, and is formed to have an interior annular space 903, with an equatorial interior circumferential pole face 905 and a first interior circumferential end pole face 740 and a second interior circumferential end pole face 760. Into the interior annular space 903 is placed a drum shaped rotor assembly 911 comprised of conventional high permeability material such as cast iron or the like. The drum shaped rotor assembly 911 is supported at each end via a first end support 913 and a second end support 915, the end supports being spiders, discs, or the like, and which are also comprised of conventional high-permeability material such as cast iron or the like. Attached to said end supports 913 and 915 are a first shaft 917 and a second shaft 919. Said shafts 917 and 919 are comprised of conventional magnetically permeable material such as steel or the like.

Second shaft 919 as shown, is considered as an output/input shaft, with first shaft 917 being hidden/blind in this embodiment. In other embodiments of the present invention, the shaft 917 may be visible, exposed, or otherwise configured.

The drum shaped rotor assembly 911 has attached to its anterior surface a high-conductivity (electrical/low-resistance) shell 921, of suitable thickness and comprised of, for example, copper. Attachment to the drum shaped rotor assembly 911 may be by way of heat shrinking or adhesive bonding, mechanical pegging or riveting, fasteners, or the like. It can be seen from the drawings that the high conductivity shell 921 is located within the magnetic air gap between the pole face 923 and the drum shaped rotor assembly 911. The high conductivity shell 921 co-rotates with the drum shaped rotor assembly 911.

Also shown located within said annular space 903 within stator 901, are a first electromagnetic field coil 925 and a second electromagnetic field coil 927, whose windings and connections are such, so as to provide for the production of magnetic flux (B-field) as depicted by the flux vector arrows 929 and 931 (electrical connections to coils are not shown.)

This embodiment will now be described in more detail, presuming again its use as a generator first (for the generation of EMF), and then secondly as a motor (for the generation of MMF).

According to well known electrodynamic principles, the translation of a conductor (in this case, the rotation of the high conductivity shell 921) within such a uniform B-field, will lead to the establishment of an EMF potential across the ends of the high conductivity shell 921 due to the Lorentz force exerted upon the free charges within the high conductivity shell 921.

There is disposed a first slip-ring 933 at one end of the high conductivity shell 921 that is in good electrical contact therewith. Electrical contact may be made, for example, by soldering, brazing, mechanical attachment, and the like. In sliding contact with the slip ring 829 is a first current collector 935 that is made from, for example, composite graphite, carbon, copper brush, and the like. This current collector 935 is brought out to the exterior of the stator 901 by way of current lead 937 to terminal 959, of which there may be a multiplicity.

Also disposed interior to the drum shaped rotor assembly 911 are power conversion electronics 939, such power conversion electronics being known to those skilled in the art, and being electrically connected to the same slip ring 933 end of the high conductivity shell 921 by way of first connection 941 and intervening connections 943 and 945.

A second slip ring 947 is provided that is electrically connected with the "output" of said power conversion electronics 939 via conductor 949 and is in sliding contact with the second slip ring 947, is a second current collector 951 and this second current-collector is brought out to the exterior of the stator 901 via second current lead 953 to terminal 955, of which there may be a multiplicity.

Further, power conversion electronics 939 are connected via a third terminal 957, and further to the other end of the high conductivity shell 921.

The purpose of the power conversion electronics (inverter) 939 is to provide a "high impedance" output (i.e., high voltage, low current) from a "low-impedance" input (i.e., low voltage, high current.)

The three-terminal configuration depicted in FIG. 9, that is elements 933, 947 and 957, will be further described such that one skilled in the art will be enabled to make and use the invention and its various embodiments.

The potential at first slip ring 933, first current collector 935, first current lead 937, second terminal 959, and first connection 941 are all at 0 volts (common). The third terminal 957 is deemed to have available (with respect to 0 volts/common) a low impedance energy source (for example, 100 V@ 10 kA may by example be considered low impedance) and said power conversion electronics 939 transforms/inverts this to, for example 8 kV@125 A. This latter output would be deemed high-impedance and suitable for real world interfacing. In this example, the current collector losses 935/933 and 951/947 would comprise about 2.5 volts×125 amps×2 for a total of about 625 watts (out of (1 megawatt). In contrast, the usual "low-impedance" form of construction of this topology, would have incurred current collector losses greater than 5 volts×10 kiloamps×2=100 kilowatts or more.

The presumption above that said power conversion electronics 939 receive low impedance across connection terminals 941 and 957 is predicated on the electrical connections from either end of said high conductivity shell 921. The one end is directly connected via connection 941, second connection 943 and third connection 945, and hence, since second connection 943 and multiples thereof, traverses all the uniform flux within the high conductivity shell 921, it will exhibit destructive EMF induction. Further, the other end connection 961, via first conductor 963 and multiples thereof, must traverse all the flux across first gap 965 during rotation there through. This first conductor 963 would experience motional EMF induction that is also opposite (i.e., destructive) to that which is desired.

In fact, between the first conductor 963 and second connection 943, their induced motional EMF will summate to that which is induced in the high conductivity shell 921, but of opposing polarity, providing for a sum of net zero (EMF cancellation.) The above, is the actual occurrence if "normal" electrically conductive materials are utilized for the first conductor 963 and second connection 943, such as, for example, copper.

The third connection 945, connection 969, third terminal 957 and annular connector 967, as well as power conversion electronics 939 are all located within the interior of the drum shaped rotor assembly 911, and are devoid of any induced motional EMF, since they are not exposed to any B-field/flux and hence are considered electrically neutral (except for their conductivity/resistance.)

Again, in order to achieve the object of the present invention, conductors 943 and 963 are comprised of suitable High Temperature Superconducting Material (typically of bulk type, not conductive matrix type; as a conductive matrix of, for example, silver or gold, would be self-defeating.) This form of conductor will provide flux exclusion at temperatures below Tc and within a flux density below Hc and at currents sub-Jc. In some embodiments of the present invention, low temperature superconducting material may be used. Accordingly, no reverse EMF is provided by said conductors 943 and 963. It should be noted that if the induced EMF of about 50 volts could be tolerated in conductor element 949 (i.e., 8 kV−50=7,950V), one could dispense with conductor 949 being comprised of High Temperature Superconducting Material and utilize copper or the like.

It is, therefore, apparent that there has been provided, in accordance with the various objects of the present invention, an Internal Impedance Converting Superconducting Acyclic Power Converter. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the claims appended herein.

What is claimed is:

1. A rotary electromechanical power converter comprising:
   a frame comprising field coils and a shaft disposed between the field coils;
   a flux isolating rotor assembly contained within the frame and having a conductive plate like shell conformed to the rotor assembly, said rotor assembly coupled to said shaft;
   a first conductor made from superconducting material and in series electrical contact with said conductive plate like shell; and
   a second conductor made from superconducting material and in series electrical contact with said conductive plate like shell.

2. The electromechanical power converter as recited in claim 1. wherein the electromechanical power converter is acyclic.

3. The electromechanical power converter as recited in claim 1 further comprising a cryogenic cooler operatively coupled to said first conductor and said second conductor for lowering the operating temperature of said first conductor and said second conductor.

4. The electromechanical power converter as recited in claim 1 further comprising power conversion electronics.

5. The electromechanical power converter as recited in claim 4 wherein the power conversion electronics are anterior to the rotor assembly.

6. The electromechanical power converter as recited in claim 4 wherein the power conversion electronics are interior to the rotor assembly.

7. The electromechanical power converter as recited in claim 1 wherein the field coils comprise superconducting field coils.

8. The electromechanical power converter as recited in claim 1 further comprising brushes and slip rings for making electrical contact with the conductive shell of the rotor assembly.

9. The electromechanical power converter as recited in claim 1 further comprising a brushless exciter for making electrical contact with the conductive shell of the rotor assembly.

10. A rotary electric machine rotor topology comprising a cylinder, a rotary shaft coupled to the cylinder, a conductive plate like shell conformed to the cylinder, a first superconducting conductor in series electrical contact with the conductive plate like shell and a second superconducting conductor in series electrical contact with the conductive plate like shell.

11. The electric machine rotor of claim 10, wherein the conductive shell is copper.

12. The electric machine rotor of claim 10, further comprising power conversion electronics internal to said cylinder.

13. The electric machine rotor of claim 10, further comprising power conversion electronics anterior to said cylinder.

* * * * *